(12) United States Patent
Mlodzinski (10) Patent No.: US 12,155,910 B2
(45) Date of Patent: Nov. 26, 2024

(54) ARBITRATED CONTENT CONSUMPTION

(71) Applicant: Comcast Cable Communications, LLC, Philadelphia, PA (US)

(72) Inventor: Walter Mlodzinski, Doylestown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/206,964

(22) Filed: Jun. 7, 2023

(65) Prior Publication Data

US 2023/0403439 A1 Dec. 14, 2023

Related U.S. Application Data

(63) Continuation of application No. 14/255,806, filed on Apr. 17, 2014, now Pat. No. 11,716,517.

(60) Provisional application No. 61/813,571, filed on Apr. 18, 2013.

(51) Int. Cl.
*H04N 21/81* (2011.01)
*H04H 60/37* (2008.01)
*H04H 60/65* (2008.01)
*H04N 21/24* (2011.01)
*H04N 21/466* (2011.01)

(52) U.S. Cl.
CPC ....... *H04N 21/812* (2013.01); *H04N 21/2407* (2013.01); *H04N 21/4667* (2013.01); *H04H 60/375* (2013.01); *H04H 60/65* (2013.01)

(58) Field of Classification Search
CPC ............. H04N 21/812; H04N 21/2407; H04N 21/4667; H04H 60/375; H04H 60/65
See application file for complete search history.

(56) References Cited

U.S. PATENT DOCUMENTS

| | | | |
|---|---|---|---|
| 6,609,253 B1 | 8/2003 | Swix et al. | |
| 7,546,617 B1 * | 6/2009 | Kienzle | H04N 21/812 725/23 |
| 9,386,328 B1 | 7/2016 | Crane et al. | |
| 9,462,344 B1 | 10/2016 | Sheedy et al. | |
| 2004/0025174 A1 | 2/2004 | Cerrato | |
| 2004/0073947 A1 | 4/2004 | Gupta | |
| 2006/0013554 A1 | 1/2006 | Poslinski | |
| 2006/0031892 A1 | 2/2006 | Cohen | |
| 2007/0150338 A1 | 6/2007 | Malik | |
| 2008/0187279 A1 | 8/2008 | Gilley et al. | |
| 2009/0031339 A1 | 1/2009 | Pickens et al. | |

(Continued)

*Primary Examiner* — Randy A Flynn
(74) *Attorney, Agent, or Firm* — Banner & Witcoff, Ltd.

(57) ABSTRACT

Some aspects may include determining whether to allow a skip over a portion of required content based on the amount of time elapsed since a portion of required content was played. The amount of time elapsed since a portion of required content was played may be measured based on the sum time of content played, or may be based on the amount of wall time elapsed. The determination of whether to allow a skip over a portion of required content may be made based on comparing the amount of time elapsed since a portion of required content was played to a threshold amount of time. Some aspects may allow free navigation within content if the amount of time elapsed is less than the threshold, and may restrict navigation or require playback of required content if the amount of time elapsed is greater than the threshold.

20 Claims, 5 Drawing Sheets

(56) References Cited

U.S. PATENT DOCUMENTS

| | | |
|---|---|---|
| 2009/0210899 A1 | 8/2009 | Lawrence-Apfelbaum et al. |
| 2009/0288131 A1 | 11/2009 | Kandekar et al. |
| 2010/0175079 A1 | 7/2010 | Braun et al. |
| 2010/0290761 A1 | 11/2010 | Drake et al. |
| 2011/0145856 A1 | 6/2011 | Agarwal et al. |
| 2011/0219401 A1 | 9/2011 | Candelore et al. |
| 2011/0243533 A1 | 10/2011 | Stern et al. |
| 2012/0015736 A1 | 1/2012 | Vanbragt et al. |
| 2012/0072286 A1 | 3/2012 | Kilar et al. |
| 2012/0268591 A1 | 10/2012 | Kimura |
| 2012/0278831 A1 | 11/2012 | van Coppenolle et al. |
| 2013/0014190 A1 | 1/2013 | Sansom et al. |
| 2013/0031579 A1 | 1/2013 | Klappert |
| 2013/0064524 A1 | 3/2013 | Griffin et al. |
| 2014/0304730 A1 | 10/2014 | Lettau et al. |
| 2018/0198867 A1 | 7/2018 | Dao et al. |
| 2019/0274178 A1 | 9/2019 | Salkintzis et al. |
| 2020/0374965 A1 | 11/2020 | Liu |

\* cited by examiner

```
on session setup:
  if EnableJumpAheadFreePass == True:
    # make each session start with an expired free pass
    LastAdBreakWatchedTimestamp = Now - FreePassSecs
    DelayedJumpAheadNPT = 0
```

FIG. 5A

```
on jump-ahead request:
  if EnableJumpAheadFreePass == True:
    if currently in an active forward-restricted item:
      if (Now - lastAdBreakWatchedTimestamp).seconds < FreePassSecs:
        # free pass has not expired
        allow the jump
        DelayedJumpAheadNPT = 0
      else:
        reject the jump
    else:
      # this is a jump-ahead request from inside an item that is not currently
      # forward-restricted but it could be an attempt to jump over forward-restricted items
      if attempting to jump over any active forward-restricted items:
        if (Now - lastAdWatchedTimestamp).seconds < FreePassSecs:
          # free pass has not expired
          allow the requested jump
          DelayedJumpAheadNPT = 0
        else:
          # free pass expired
          delayedJumpAheadNPT = requested jump NPT
          abbreviate the jump (i.e. jump to the first forward-restricted item)
      else:
        allow the requested jump
        DelayedJumpAheadNPT = 0
  else:
    # since FreePass mode is disabled then
    reject the jump
```

FIG. 5B

```
If currently playing item is forward-restricted:
  if EnableJumpAheadFreePass == True:
    if the next item (going into) is not actively forward-restricted:
      # determine that we're leaving an ad 'break'
      LastAdBreakWatchedTimestamp = Now
      if DelayedJumpAheadNPT > 0 and EnableDelayedJumpAhead == True:
        jump to DelayedJumpAheadNPT
```

FIG. 5C

ARBITRATED CONTENT CONSUMPTION

CROSS REFERENCE TO RELATED APPLICATION

This application is a continuation of U.S. application Ser. No. 14/255,806, filed Apr. 17, 2014, which claims the benefit of U.S. Provisional Application No. 61/813,571, filed Apr. 18, 2013, each of which is hereby incorporated by reference in its entirety.

BACKGROUND

Advertisers desire users to watch all advertisements in video content, and users often do not desire to watch any advertisements in video content. If users watch fewer advertisements in video content, advertiser-sponsored video content suffers. If users are shown too many advertisements, user viewing may suffer. Thus, a balance needs to be arbitrated between the needs of the user and the needs of the advertisers.

SUMMARY

The following summary is for illustrative purposes only, and is not intended to limit or constrain the detailed description. Aspects herein enable different techniques for interacting with users. In some aspects, some content may be marked as required content. Required content may include advertisements, video clips, video-on-demand content, or any other type of content. A user's ability to interact with or control required content may be different than the user's ability to interact with or control other content. For example, in one aspect, a user may "jump" over certain video content or advertisements, while being required to watch other video content or advertisements.

Some other systems may show required content to a user every time the user encounters the required content during playback. For example, if a user partially watched a video program, then some time later wished to resume the video program, the video program may begin playback at the beginning. The user may wish to skip ahead to only view the portion of the video program that the user has not yet watched. But to skip ahead to only view the portion of the video program that the user has not yet watched, the user may attempt to skip past several portions of the video content where the video would normally play required content. For example, a video may be marked to play advertisements every seven minutes. If the user attempts to resume playback 25 minutes into a 60 minute video program, the user may attempt to skip past three advertisement segments—one at 7 minutes, one at 14 minutes, and one at 21 minutes. The user may be frustrated at being required to watch three advertisement segments in a row when the user is simply trying to navigate forward to only watch a previously-unwatched portion of a video.

Thus, in some aspects, the system may track an amount of time a user has spent watching a program without required content (e.g., advertisements) in order to determine if watching additional required content is needed. For example, after initiating a playback session, or after watching required content, a user may be given a period of time when the user can navigate freely through a video (e.g., fast forward, rewind, jump ahead) without being shown required content. The period of time when the user can navigate freely through a video may be known as a free-pass period.

In some aspects, a timestamp or other indicator may be stored when a user begins watching content, or when the user watches an advertisement. The user may be given a visual indicator of the free-pass period. For example, watching the required content (e.g., an advertisement) may cause a window to open that allows the user to fast forward through other advertisements until such time as the window closes (e.g., 5-10 minutes). Thereafter, the user may not be able to fast forward through advertisements until the user has watched another segment or required content such as one or more advertisements.

Some aspects may allow a user a larger free-pass period (and therefore have an opportunity to skip advertisements) based on a subscription fee, a higher tier of service, bundled services, promotions, or the user providing information about herself. Still additional aspects may allow a dynamic free-pass period to grow based on certain activities of the user (e.g., the user may earn credits based on their behavior). For example, there may be incentive options that allow a user to increase their free-pass period such as: completing a survey, reviewing certain material, interacting with an advertisement, clicking on certain content such as an interactive advertisement or show website, or selecting a category of advertisements the viewer is most interested in watching. For example, if a customer indicates that the user is interested in new vehicles, SUV or cross-over vehicles, and Ford vehicles, the user may be provided with more free-pass time, while the system provides more targeted advertisements.

Some aspects may adjust the free-pass period based on the method in which a user watched required content. For example, if a user watches an advertisement at normal speed, the free-pass period may be larger than if a user watches an advertisement at an accelerated speed. A user may be given a larger free-pass period for watching an advertisement at an accelerated speed than for skipping an advertisement altogether. If a watches an advertisement more than once (e.g., rewinds and replays the advertisement), a free-pass period may be larger.

Free-pass time may be configured in different ways. In some embodiments, free-pass time may elapse or count down when a user is watching video content such as video-on-demand content. Additionally, allowing the user to fast-forward during a free-pass period or jump over advertisements may give the user an incentive to provide additional information that may facilitate more targeted advertisements. Additionally, in some aspects, the user may be given a choice over what advertisements the user may watch, e.g., when the user watches advertisements. If the user makes a proactive user selection, the user may be more likely to engage with the ad material, and therefore may receive a larger free-pass period.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

These and other features, aspects, and advantages of the present disclosure will become better understood with regard to the following description, claims, and drawings. The present disclosure is illustrated by way of example.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
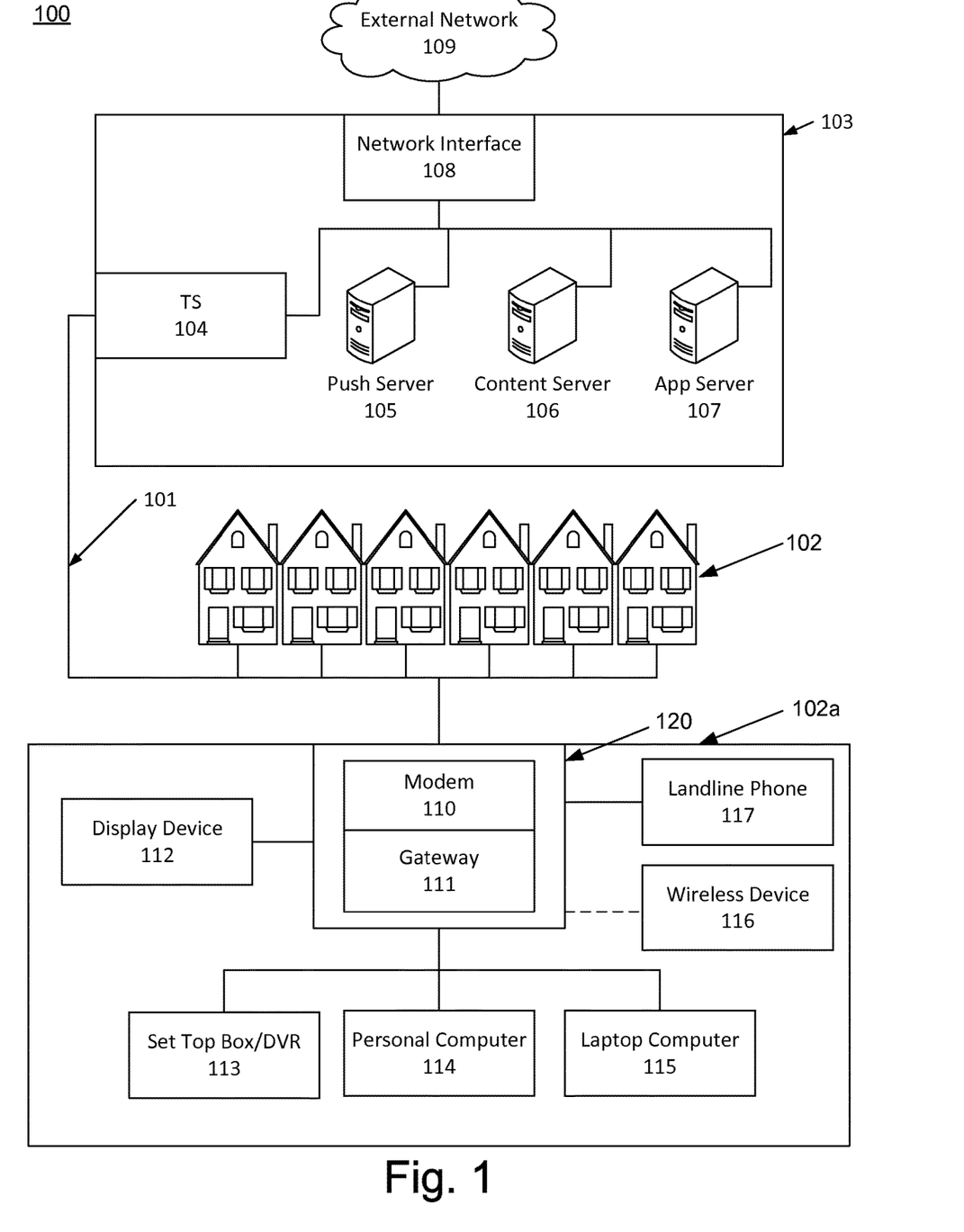
FIG. 1 illustrates an example communication network on which various features described herein may be implemented.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be one or more computing devices configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be one or more computing devices configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be one or more computing devices that communicate with the modem(s) 110 to allow one or more other devices in the premises 102*a*, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102*a*, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g., Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
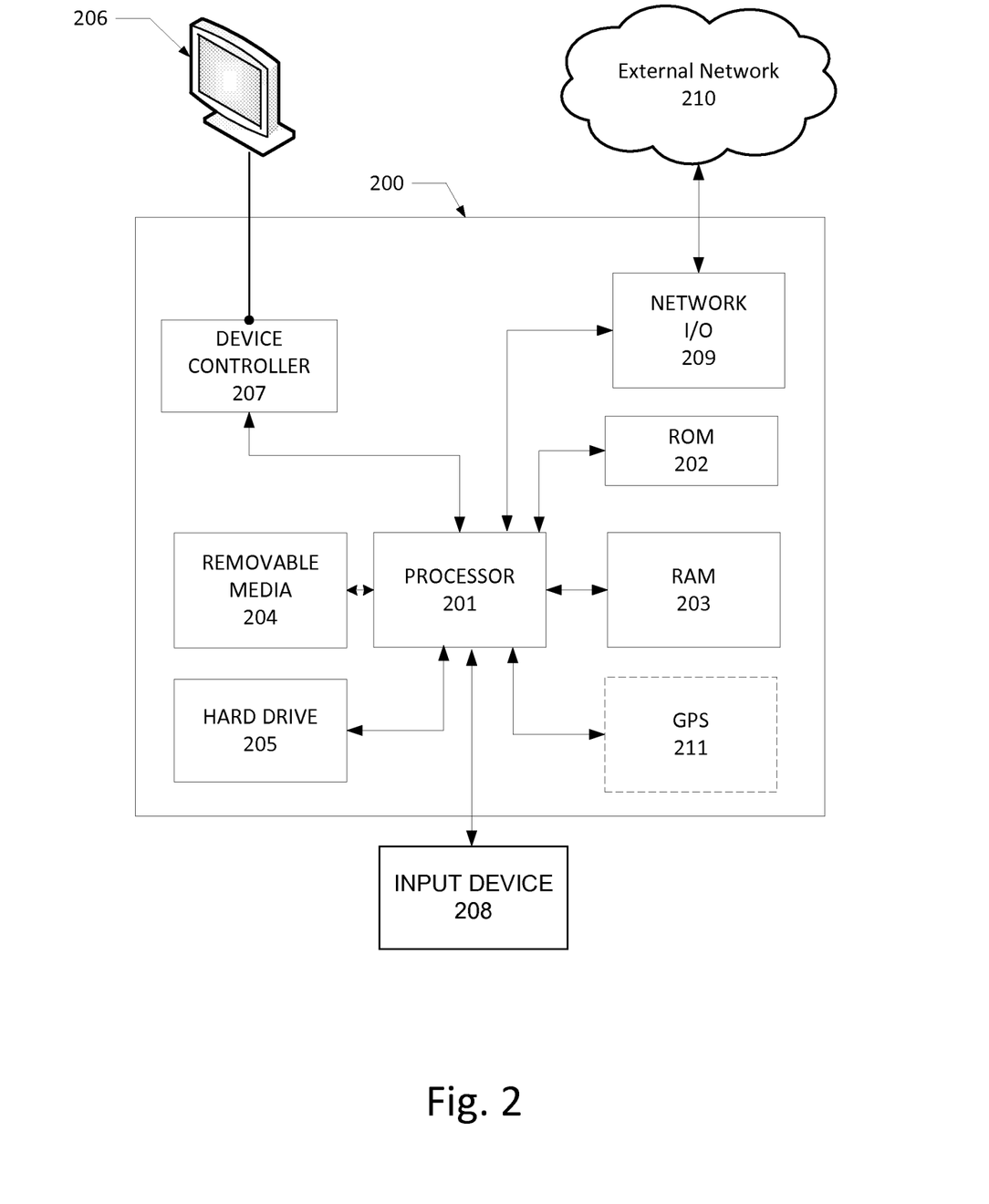
FIG. 2 illustrates an example computing device that can be used to implement any of the system, methods, servers, entities, and computing devices described herein.

Having described an example communication network shown in FIG. 1 in which various features described herein may be implemented, an example computing device as shown in FIG. 2 will be described.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, camera input for user gestures, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, in some embodiments the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be wholly or partially implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

In one illustrative embodiment, a device for controlling video such as computing device 200 and/or content server 106 may be configured to allow "trick-play mode" operations, such as jumping ahead or back a set amount of time (e.g., a five-minute jump), fast forward, fast rewind, movement of a location indicator of the video, etc.

In order to strike a balance between advertiser and user interests, it may be desirable to store one or more indicators, such as time stamps and/or current time, using some predetermined action, such as when required content (e.g., an advertisement) is completely watched at normal or play speed. The timestamp or indicator may be used later to determine how long it has been since the user watched required content.

For example, when a trick-play mode (e.g., jump-ahead) request is made by the user, the computing device 200 and/or content server 106 may determine whether or not conditions are suitable for allowing the user to take the requested action. For example, the computing device and/or content server may determine a new indicator/timestamp (e.g., of the current time), and compare the new indicator/timestamp to the previous indicator/timestamp to determine whether conditions warrant allowing the requested action. In other words, the computing device 200 and/or content server 106 may determine how much wall time has elapsed since the user watched an ad. The computing device 200 and/or content server 106 may then compare the amount of wall time that has elapsed to some configurable threshold (e.g., 5 minutes). If the configurable threshold is exceeded—that is, if it has been more than the threshold amount of time since the user watched an ad—then the user may not be allowed to jump over the next segment of required content (e.g., the next advertisement). Alternatively, if the configurable threshold is not exceeded (e.g., it has been less than the threshold amount of time since the user watched an ad), then the user may be allowed to jump over the next segment of required content. Thus, when the time is below the threshold, the user may navigate to a different point in the program freely without being shown advertisements.

Thus, a method may include receiving, by a computing device, a request to skip a portion of required content, and allowing the computing device to skip the portion of required content based on a determination that a period of playing unrequired content is less than a threshold. The method may include tracking the period of playing the unrequired content, wherein the period of playing the unrequired content includes an amount of time since some required content was played.

In some aspects, the amount of time since some required content was played may include a sum playback time of a plurality of non-contiguous segments of the unrequired content. The plurality of non-contiguous segments of the unrequired content may include segments of at least two different videos. In other words, a session may not be content specific. For example, a user may begin watching one program, then switch to watching a different program. The system may track the amount of time since the user last viewed an advertisement independent of the program. Alternatively, the amount of time since the user last viewed an advertisement may be relative to the program (e.g., when the user switches to a different program, the timer may reset).

In one example, the user may be able to jump over required content, which would let the user string together a sequence and/or other trick-play modes to move to a distant point in the program without being shown advertisements.

In these examples, if the user spends time consuming program content, then the user may lose the ability to skip the next required content using, for example, trick-play mode.

In some embodiments, the system may increase the threshold based on information received from a user. For example, the user may be presented on the user's remote control with an earned ad-skip button. The user may take one or more actions to earn credits. For example, the user may earn credits by watching advertisements. The user may then use those credits to skip over other advertisements. The user may also earn credits in other ways, such as paying higher subscription fees (e.g., a higher-cost subscription level includes a higher threshold, and a lower-cost subscription level includes a lower threshold), as part of a promotion, by completing surveys, by selecting advertisements of particular importance, by achieving loyalty awards, by having many bundled services, etc.

Thus, some aspects may include prompting the user to input information about the user, receiving the input information about the user, and transmitting the input information about the user. In some aspects, the information received from the user may include information related to an advertisement preference of the user. Some aspects may include selecting the required content (e.g., advertisements) based on the advertisement preference of the user. Some aspects may consider multiple advertisement preferences of the user in selecting the required content.

The system may be configurable in a variety of ways. In some illustrative embodiments, if the user attempts to jump over several segments of required content, the computing device and/or content server 106 (e.g., VOD server) may jump to the first segment of required content or the segment of required content closest to the destination of the jump request. Alternatively, the computing device 200 and/or content server 106 could jump to the original requested destination after playing a segment of required content. In some embodiments, a user may be offered a premium service that allows the user to purchase credits that allow the user to skip advertisements based on the level of the user's service or other parameters.

Approaches in accordance with embodiments herein may be implemented using timers, watchdog timers, timestamps, and/or other indicators. Required content may include conventional advertisements, placement advertisements in video content (e.g., use of products by actors on a program). Additionally, the computing device and/or content server 106 may require either all of the advertisement to play, or alternatively for at least part of the advertisement to finish playing before the user is permitted to skip the advertisement.

Figure 3:
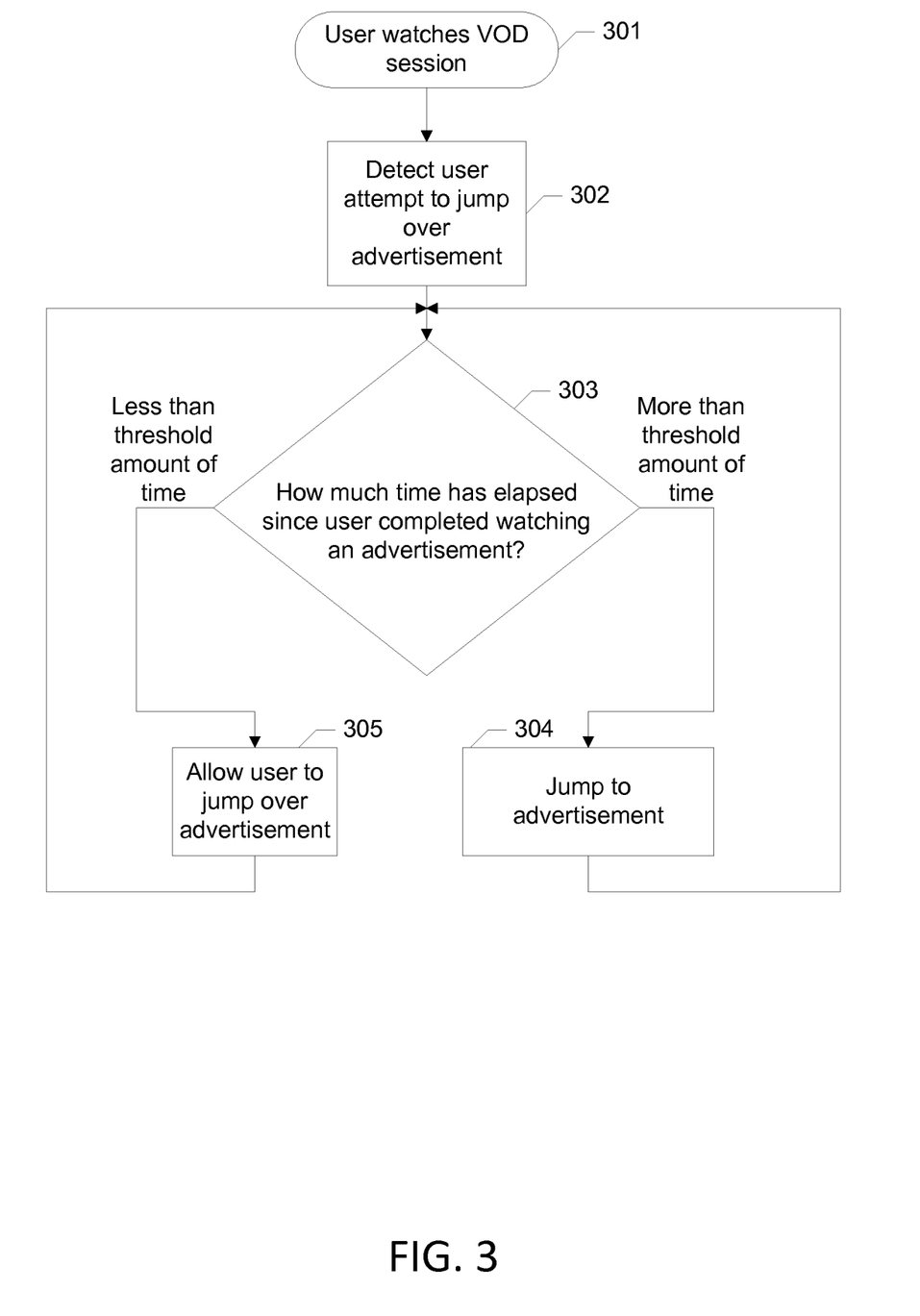
FIG. 3 illustrates a flowchart for implementing one example algorithm for implementing arbitrated ad consumption.

FIG. 3 illustrates one embodiment with respect to viewing time-shifted content, such as video-on-demand (VOD) content. The disclosure herein may be applicable to any linear content, non-time-shifted content, video, radio, television, audio, or other content.

In step 301, the user may watch VOD content. The system may detect the time that the user initiates the VOD session, and track the amount of time that has elapsed since the user began watching VOD content. The tracked amount of time may restart when the user changes VOD content, when the user turns off a device (e.g., television, set-top box, etc.), when a certain amount of time has elapsed since the user has provided any input (e.g., changed a channel, content, volume, etc.). The tracked amount of time may be based on a set time frame, such as a certain number of minutes, hours, days, etc. The tracked amount of time may be based on who is present in the session (e.g., if a single user is watching, and is later joined by another user, the tracked amount of time may restart).

In step 302, the system may receive input from a user that includes a request to engage a trick-play mode (e.g., skip ahead 5 minutes, fast forward, rewind, etc.) that would result in skipping over required content. For example, the system may receive input from the user including a request to jump ahead a set amount of time (e.g., a default amount of time the system always jumps ahead when the user presses a jump-ahead button), where the request to jump ahead the set amount of time includes a request to skip at least a portion of required content (e.g., an advertisement).

In step 303, the system may determine how much time has elapsed since the user completed watching required content (e.g., an advertisement).

The system may compare the amount of time that has elapsed to a threshold amount of time. For example, a threshold amount of time may be eight minutes. If the amount of time since the user completed watching required content is more than the threshold amount of time, then the system in step 304 may jump to one of the advertisements and play the advertisement. If the amount of time since the user completed watching an required content is less than the threshold amount of time, then the system in step 305 may allow the user to jump over the advertisement.

For example, the user may have begun watching VOD content, watched three minutes of video, then attempted to fast forward to a different location in the VOD content. If the VOD content includes an advertisement seven minutes in, and the user continues to attempt to fast forward through the advertisement, then the system may compare the amount of time since the user has watched required content to the threshold amount of time (e.g., eight minutes). In this example, the system may detect that the user just initiated a new VOD session three minutes earlier, which may be treated the same as having watched an advertisement three minutes earlier. The system thus may allow the user to fast-forward through the advertisement (or otherwise engage trick-play mode), because in this example the elapsed viewing time of three minutes is less than the example threshold of eight minutes.

If the user then watches VOD content for another ten minutes, then again tries to engage trick-play mode (e.g., skip ahead five minutes over an advertisement), the system may determine that because the user has watched thirteen minutes of content (three minutes of content plus ten minutes of content) without viewing an advertisement, then the user may not be allowed to skip over the required content (e.g., the advertisement). In some aspects, the system may jump ahead an amount of time different than a set amount of time (e.g., the amount of time the user requested to jump ahead), and the amount of time different than the set amount of time may include an amount of time between currently playing content (e.g., the user's current position) and the portion of required content.

In some embodiments, the system may automatically detect when a threshold has been reached, and adjust a setting or functionality in response to the threshold being reached. For example, the system may compare the threshold against the period of playing unrequired content (e.g., the amount of time elapsed since required content was played). The system may prevent skipping a portion of required content based on a determination that the period of playing unrequired content is greater than the threshold. For example, if the threshold is eight minutes, when eight minutes elapses since the user last viewed an advertisement, the system may automatically disable some or all trick-play functionality. For example, the system may disable jumping ahead in five-minute increments, but may still allow pause or fast forward. The system may also selectively disable some functionality. For example, the system may allow trick-play modes, but only if those trick-play modes do not result in skipping required content (e.g., an advertisement). For example, the system may allow a user to fast forward, but then disable the fast forward (resulting in resuming normal playback speed) when an advertisement is reached.

Alternatively or additionally, the system may determine the amount of time that has elapsed since the user last viewed an advertisement based on the amount of content consumed. For example, if the user starts viewing content at 5:00 pm, watches five minutes of content, then receives a phone call and pauses playback for ten minutes, then the time would be 5:15 pm. The system may determine—based on the user's consumption of five minutes of content—that five minutes have elapsed since the user last watched an advertisement.

In another embodiment, the system may determine the amount of time that has elapsed since the user last viewed an advertisement based on the amount of time that has elapsed. The time on a clock may be known as wall time (e.g., the time displayed on a clock on a wall). The system may determine whether a user is within a threshold based on the wall time. For example, if a user starts viewing content at 5:00 pm, watches five minutes of content, then receives a phone call and pauses playback for ten minutes, then the wall time would be 5:15 pm. The system may determine—based on the user's start time of 5:00 pm and the current time of 5:15 pm—that fifteen minutes have elapsed since the user watched an advertisement.

Alternatively or additionally, the user may be allowed or required to view required content in certain trick-play modes. For example, the system may allow the user to view an advertisement while fast forwarding, but not allow the user to skip ahead five minutes (which may skip the advertisement completely). In one example, the system may take into account whether the user views required content at different-than-normal playback speed. For example, the system may allow the user another four minutes—or some other amount of time—for content playback if the user views an advertisement at fast speed.

After the user views required content in step 304, then the system timer may reset (e.g., a new timestamp may be created), and the user may continue viewing unrequired content (e.g., VOD content).

Figure 4:
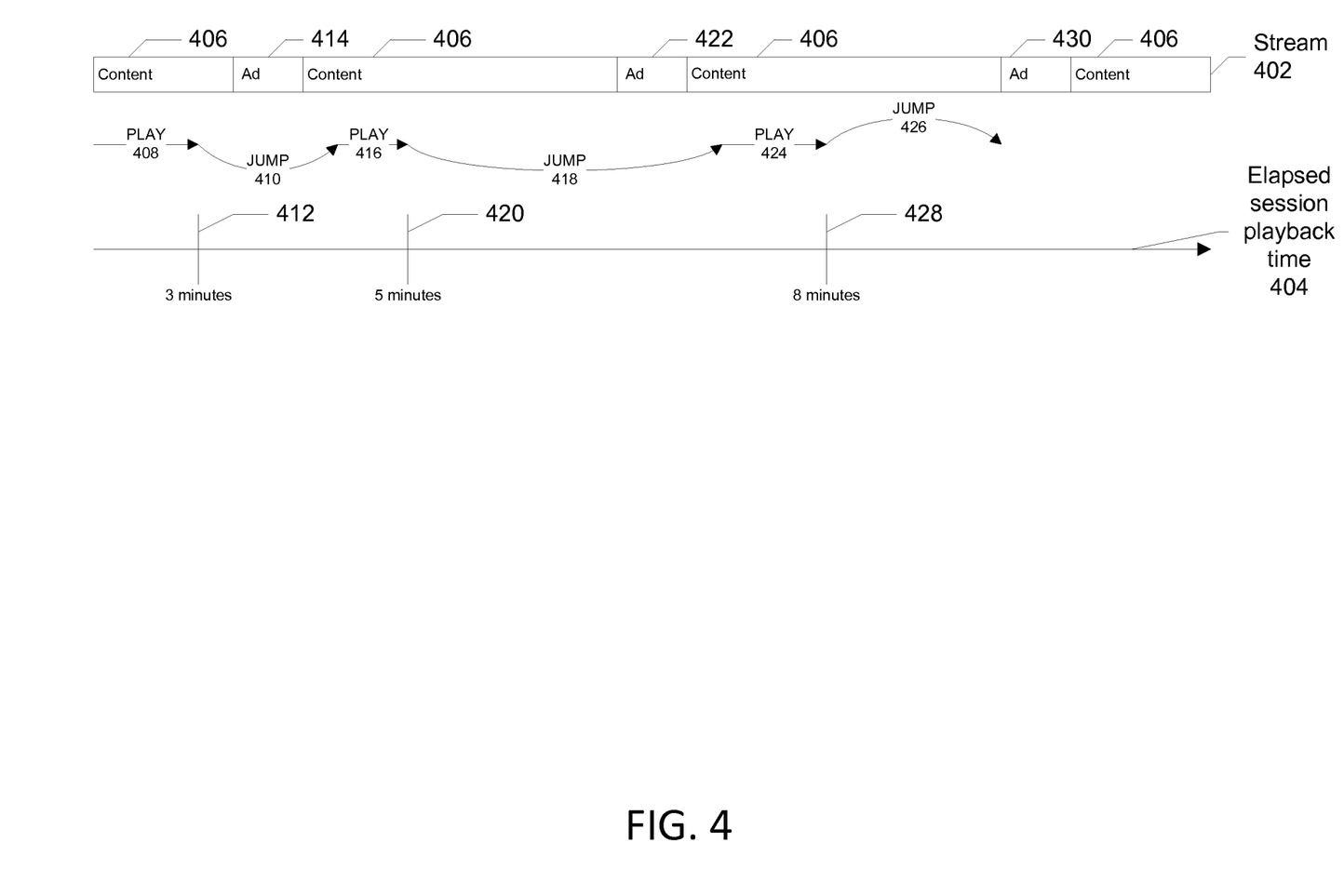
FIG. 4 illustrates an example flow diagram for implementing arbitrated ad consumption.

FIG. 4 provides one illustrative embodiment of a block/flow diagram representing one implementation in accordance with embodiments herein. In the depicted embodiment, stream 402 may include unrequired content 406 (e.g., a video program) and required content (e.g., advertisements 414, 422, 430). Elapsed session playback time 404 may include the amount of time that has elapsed since the user began watching content. Note that elapsed session playback time may not correspond to the playback position in stream 402. The system may include a threshold amount of time within which a user is allowed to initiate trick-play mode before viewing an advertisement. For example, in the depicted embodiment, the threshold may be seven minutes. In other examples, the threshold time may be higher or lower, as discussed earlier, and may differ based on a number of factors.

In one illustrative use scenario, a user may begin consuming content. For example, the content may play 408 for three minutes. After playing for three minutes, the user may initiate a jump forward 410. In some aspects, the user may initiate some other type of trick-play mode (e.g., fast forward). The jump forward 410 may include a jump over advertisement 414. The system may determine that at the time the user requested the jump forward 410, the elapsed session playback time was at three minutes 412. The system may determine that because the elapsed session playback time of three minutes 412 is less than the depicted threshold time of seven minutes, the user may jump forward 410.

The user may continue consuming content. For example, the content may play 416 for two minutes. After playing for two minutes, the user may initiate a jump forward 418. The jump forward 418 may include a jump over advertisement 422. The system may determine that at the time the user requested the jump forward 418, the elapsed session playback time is at five minutes 420. The system may determine that because the elapsed session playback time of five minutes 420 is less than the depicted threshold time of seven minutes, the user may jump forward 418.

The user may continue consuming content. For example, the content may play 424 for three minutes. After playing for three minutes, the user may initiate a jump forward 426. The jump forward 426 may include a jump over at least part of advertisement 420. The system may determine that at the time the user requested the jump forward 426, the elapsed session playback time is at eight minutes 428. The system may determine that because the elapsed session playback time of eight minutes 428 is greater than the depicted threshold time of seven minutes, the jump forward 426 may jump to the beginning of advertisement 430. In other words, the jump forward 426 may jump to the beginning of advertisement 430 instead of to the jump forward 426's original destination past at least part of advertisement 430.

The user may then be required to view advertisement 430. After viewing advertisement 430, the elapsed session playback time 404 may reset to zero, indicating the amount of time since the user last viewed an advertisement. Alternatively, the system may mark a timestamp or indicator indicating the time at which the user last viewed an advertisement. Then, the threshold time may be compared against the most recent timestamp or indicator indicating the time at which the user last viewed an advertisement.

Thus, in one aspect, the system may determine an amount of time to advance during playback of video content based on an amount of time elapsed since an advertisement was played. Some aspects may include receiving a require to advance the playback of the video content by a requested amount of time. Some aspects may include advancing the playback of the video content the requested amount of time in response to determining that the amount of time elapsed since an advertisement was played is less than a threshold, and advancing the playback of the video content a different amount of time in response to determining that the amount of time elapsed since an advertisement was played is greater than a threshold. Some aspects may include increasing the threshold in response to receiving, from a user, information related to an advertising preference of the user.

Figure 5A:
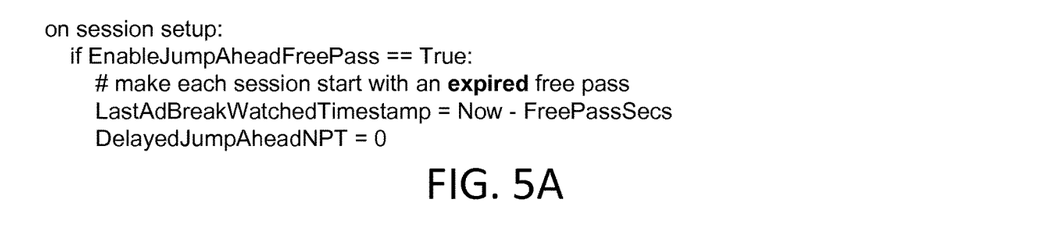
FIGS. 5A-C illustrate examples of code for implementing arbitrated ad consumption.
Figure 5B:
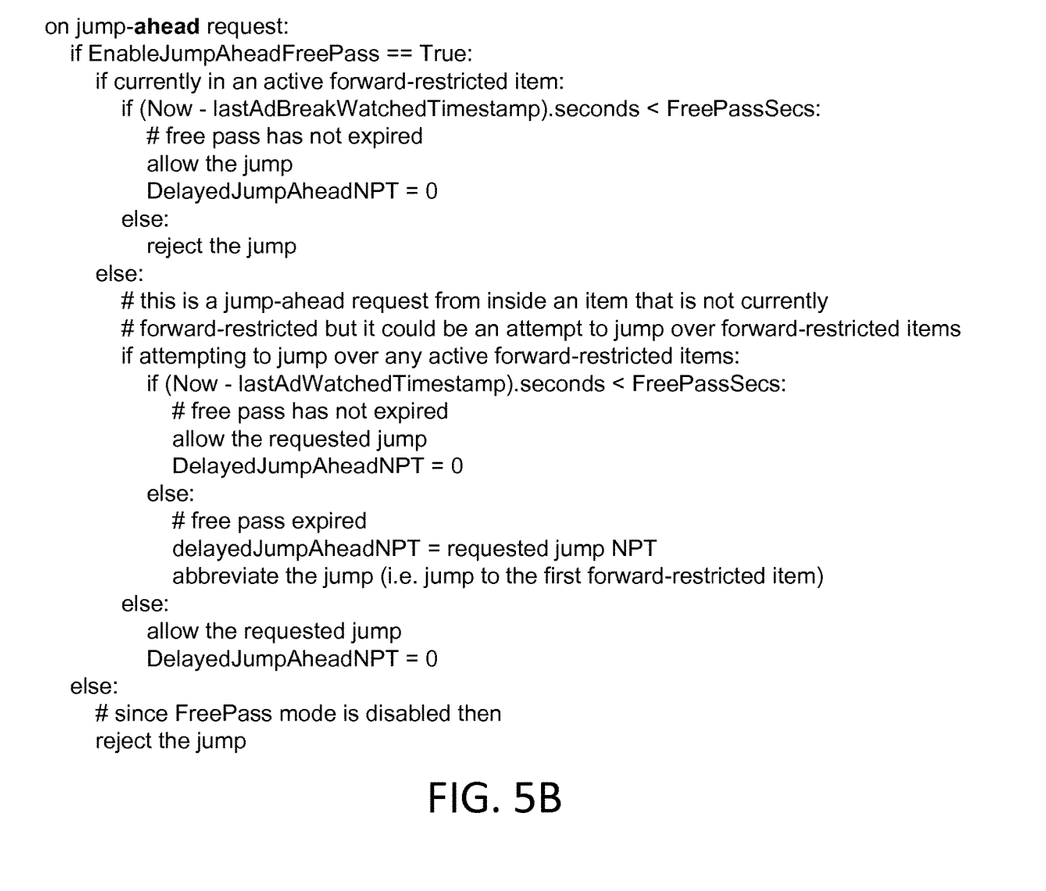
Figure 5C:
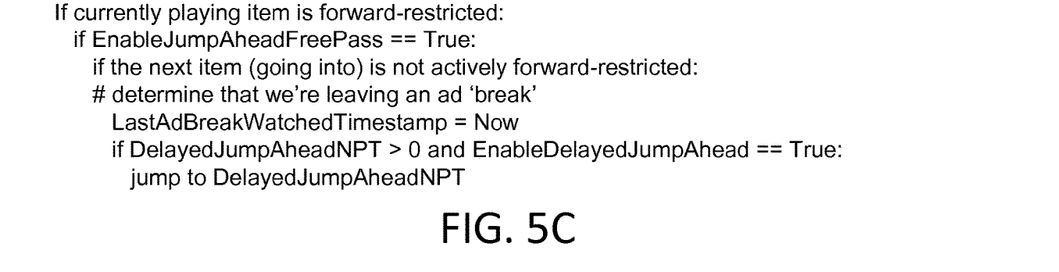

FIGS. 5A-C provide examples of code for implementing aspects of the disclosure. The algorithm depicted in FIGS. 5A-C may be similar to the flow chart in FIG. 3 or the block/flow diagram in FIG. 4. Lines starting with a # may be comments to assist in interpreting the examples of code.

FIG. 5A depicts examples of code for an example session setup. On session setup, the system may determine whether trick-play modes are enabled. For example, the system may determine if fast forward, jump ahead, or other trick-play modes are allowed. If trick-play modes are not allowed, then the user may not be allowed to skip over required content (e.g., advertisements).

The system may, on session setup, create an initial timestamp of the last time the user watched an advertisement. Since the session may be just starting, the user may not have watched an advertisement, so the timestamp may be the time the session began. The timestamp may be adjusted based on one or more factors (e.g., user's subscription profile, user's participation in an incentive, the content, etc.).

FIG. 5B depicts examples of code for an example system response to a trick-play mode request. In the depicted example, the system may receive a user request to jump ahead. The system may determine if jumps ahead are allowed. If jumps ahead are not allowed, the system may reject the jump.

If jumps ahead are allowed, the system may determine if the currently-playing content is required content (e.g., an advertisement). If the currently-playing content is required content, the system may determine the amount of time since the user last watched an advertisement by checking the timestamp of the last-viewed advertisement. The system may compare the amount of time since the user last watched an advertisement to a threshold amount of time. If the time since the user last watched an advertisement is less than the threshold, the system may allow the jump ahead. If the amount of time since the user last watched an advertisement is greater than the threshold, the system may reject the jump.

If the currently-playing content is not required content, the system may determine if the jump would result in jumping over at least a part of required content. If the jump would result in jumping over required content, the system may determine the amount of time since the user last watched an advertisement by checking the timestamp of the last-viewed advertisement. The system may compare the amount of time since the user last watched an advertisement to a threshold amount of time. If the time since the user last watched an advertisement is less than the threshold, the system may allow the jump ahead. If the amount of time since the user last watched an advertisement is greater than the threshold, the system may adjust the jump so that the currently-playing content jumps to the beginning of the next advertisement. If the jump would not result in jumping over at least a part of required content, the system may allow the jump.

FIG. 5C depicts examples of code for an example system response to completing playback of required content (e.g., an advertisement).

In the depicted embodiment, if the currently playing item is required content, then the system may determine if trick-play mode is allowed. If trick-play mode is allowed, then the system may determine whether the next item queued for playback (e.g., after the end of the required content) is required content. If the next item queued for playback is not required content, it may be unrequired content (e.g., VOD content). The system may then update the timestamp indicating the last time that the user completed watching an advertisement to indicate the time that the advertisement ended and unrequired content resumed.

The user may have requested a trick-play action before the required content began playing. For example, the user may have requested a jump, but have been required to watch an advertisement instead. After the advertisement ends, the system may determine that the user had requested a jump, and then honor the user's request and perform the jump.

In some aspects, a user may jump over certain advertisements while being required to watch other advertisements.

In some aspects, the user may be given a visual indicator of the amount of time the user may skip over advertisements or other portions of video content. That is, in some aspects, the system may show a visual indicator of a threshold. In one example, a timestamp or other indicator may be stored every time a user watches an advertisement at normal speed. After a user watches an advertisement at a normal speed, a window or other indicator may appear that indicates to the user how much time the user has to fast forward or skip over advertisements. After the time is up, the window or other indicator may disappear, or otherwise indicate to the user that the user may no longer skip advertisements. At that point the user may not be able to fast forward through advertisements until the user has watched another advertisement.

In some aspects, the system may track the time elapsed since the user viewed an advertisement based on the amount of wall time elapsed since the program began playing.

In some aspects, the system may track an amount of time a user has spent watching a program without advertisements in order to determine if or when the user is required to watch an advertisement. That is, the system may track the time since the user viewed an advertisement based on the amount of time content has played. For example, if a user actually only watches five minutes of a program during a twenty minute period (e.g., because the user is fast forwarding, pausing, skipping sections of content, etc.), then the system may determine when to require the user to view an advertisement based on program time consumed instead of wall time elapsed.

In some aspects, a user may have a larger free-pass period, and therefore have more time to skip advertisements, based on a subscription fee or a higher tier of service. In some aspects, the free-pass period may be similar to or the same as the threshold. For example, if a user has a basic cable subscription, the user may have a lower threshold time in between advertisements than a user that has a cable subscription with many features.

In some aspects, a free-pass period (e.g., time period in which the user may skip advertisements) may be dynamic. For example, a free-pass period may grow or shrink based on credits earned or used by a user. For example, there may be incentive options that allow a user to increase the user's free-pass period, such as completing a customer survey, view advertisements, rate advertisements (e.g., like or dislike certain advertisements), interact with (e.g., click on) interactive advertisements, select a category of advertisements the user is most interested in watching, etc. For example, if a user is interested in cars, but not interested in puppies, the user may indicate that the user is interested in vehicles, but not interested in puppies. The user's indication may be specific or general. For example, the user may indicate that the user is interested in new vehicles, sport-utility vehicles, cross-over vehicles, FORD vehicles, etc. Advertisements displayed to the user may then be filtered or targeted according to the user's indicated preferences. For example, the system may detect that a puppy advertisement is scheduled to play, and may replace the puppy advertisement with a sport-utility vehicle advertisement instead. Additionally, the user may, as a reward or incentive for providing information about the types of advertisements that the user is interested in, receive one or more credits. The user's credits may increase the user's free-pass period.

In some aspects, the user may be provided with a choice between multiple advertisements when the advertisement period begins. If the user does not select an advertisement within a set period of time (e.g., three seconds), the system may automatically play one or more of the advertisements. The system may track the user's selected advertisements, and learn from the user's selections. For example, if the user consistently selects to view vehicle advertisements, and the user consistently does not select to view advertisements with puppies, the system may determine that the user is interested in vehicles and not in puppies, and target future advertisements accordingly.

Some aspects may include receiving, by a computing device, a request to skip a portion of currently playing video, determining an amount of time that the currently playing video has been playing since a most-recent advertisement was played, if the amount of time that the currently playing video has been playing since the most-recent advertisement was played is greater than a threshold, requiring playback of another advertisement before allowing the skip of the portion of currently playing video, and if the amount of time that the currently playing video has been playing since the most-recent advertisement was played is less than the threshold, allowing the skip of the portion of the currently playing video.

In some aspects, the amount of time that the currently playing video has been playing since a most-recent advertisement was played may include a sum amount of playback time of a plurality of segments of the currently playing video. Some aspects may include disabling trick-play mode operations if the amount of time that the currently playing video has been playing since the most-recent advertisement was played is greater than the threshold, and enabling trick-play mode operations after playing another advertisement.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

It is noted that various connections are set forth between elements in the following description. These connections are described in general and, unless specified otherwise, may be direct or indirect; this specification is not intended to be limiting in this respect.

The invention claimed is:

1. A method comprising:
   enabling, by a computing device, a fast-forward command for a first quantity of time after a first presentation of:
   an end of a first media clip, of a plurality of media clips interspersed between a plurality of program segments, and
   disabling the fast-forward command after the first quantity of time;
   enabling the fast-forward command for a second quantity of time based on a repeat presentation of the first media clip at a user device, wherein the second quantity of time is:
   between the end of the repeat presentation of the first media clip at the user device and a time when the fast-forward command will be disabled; and
   greater than the first quantity of time;
   receiving, from the user device, a request to fast-forward a second media clip of the plurality of media clips; and
   causing, based on determining, by the computing device, that the request occurred during the second quantity of time after the repeat presentation, the requested fast-forward of the second media clip.

2. The method of claim 1, further comprising:
   enabling the fast-forward command for increasing quantities of time for additional repeat presentations, at the user device, of the first media clip.

3. The method of claim 1, wherein the causing is based on determining that a sum of respective playback times of a plurality of non-contiguous program segments of the plurality of program segments is less than the second quantity of time.

4. The method of claim 1, wherein the plurality of program segments comprises at least a first program and a second program different from the first program,
wherein the method further comprises:
before receiving the request to fast-forward the second media clip, receiving a request to stop playback of the first program and to start playback of the second program,
wherein receiving the request to fast-forward the second media clip comprises receiving a request to fast-forward a media clip included in the second program, and
wherein the causing is based on determining that a sum of a time period that the first program was presented at the user device and a time period that the second program was presented at the user device is less than the second quantity of time.

5. The method of claim 1, further comprising:
based on determining that a quantity of time that one or more media clips, of the plurality of media clips, have been presented at the user device satisfies a threshold, displaying a selectable visual indicator associated with skipping the second media clip.

6. The method of claim 1, further comprising:
sending, from the computing device and to a different device, authentication information for the computing device; and
determining the second quantity of time based on the authentication information.

7. The method of claim 1, wherein a difference between the first quantity of time and the second quantity of time is based on user interaction with the first media clip.

8. The method of claim 1, wherein the plurality of media clips comprise advertisement content.

9. The method of claim 1, further comprising extending the first quantity of time based on a determination that a second user has joined a first user in viewing one or more of the plurality of program segments at the user device.

10. The method of claim 1, wherein receiving the request to fast-forward the second media clip comprises:
receiving, from the user device, a request to jump ahead a set quantity of time in the plurality of program segments, wherein the set quantity of time comprises a playback time of the second media clip and a playback time of at least one program segment of the plurality of program segments.

11. The method of claim 1, wherein receiving the request to fast-forward the second media clip comprises:
receiving, from the user device, a request to jump ahead a set quantity of time in the plurality of program segments, wherein the set quantity of time comprises a quantity of time between a current playback position in the plurality of program segments and a next fixed time in the plurality of program segments.

12. One or more non-transitory computer-readable media storing instructions that, when executed by one or more processors, cause:
enabling, by a computing device, a fast-forward command for a first quantity of time after a first presentation of:
an end of a first media clip, of a plurality of media clips interspersed between a plurality of program segments, and
disabling the fast-forward command after the first quantity of time;
enabling the fast-forward command for a second quantity of time after a repeat presentation of the end of the first media clip at a user device, wherein the second quantity of time is greater than the first quantity of time based on the repeat presentation;
receiving, from the user device, a request to fast-forward a second media clip of the plurality of media clips; and
causing, based on determining, by the computing device, that the request occurred during the second quantity of time after the repeat presentation, the requested fast-forward of the second media clip.

13. The one or more non-transitory computer-readable media of claim 12, wherein the instructions, when executed by the one or more processors, cause:
enabling the fast-forward command for increasing quantities of time for additional repeat presentations, at the user device, of the first media clip.

14. The one or more non-transitory computer-readable media of claim 12, wherein the causing is based on determining that a sum of respective playback times of a plurality of non-contiguous program segments of the plurality of program segments is less than the second quantity of time.

15. The one or more non-transitory computer-readable media of claim 12, wherein the plurality of program segments comprises at least a first program and a second program different from the first program,
wherein the instructions, when executed by the one or more processors, further cause:
before receiving the request to fast-forward the second media clip, receiving a request to stop playback of the first program and to start playback of the second program, and
the receiving the request to fast-forward the second media clip by receiving a request to fast-forward a media clip included in the second program, and
wherein the causing is based on determining that a sum of a time period that the first program was presented at the user device and a time period that the second program was presented at the user device is less than the second quantity of time.

16. The one or more non-transitory computer-readable media of claim 12, wherein the instructions, when executed by the one or more processors, further cause extending the first quantity of time based on a determination that a second user has joined a first user in viewing one or more of the plurality of program segments at the user device.

17. A system comprising:
a user device and a computing device,
wherein the computing device is configured to:
enabling a fast-forward command for a first quantity of time after a first presentation of:
an end of a first media clip, of a plurality of media clips interspersed between a plurality of program segments, and
disabling the fast-forward command after the first quantity of time;
enabling the fast-forward command for a second quantity of time after a repeat presentation of the end of the first media clip at a user device, wherein the second quantity of time is greater than the first quantity of time based on the repeat presentation;
receive, from the user device, a request to fast-forward a second media clip of the plurality of media clips; and
cause, based on determining that the request occurred during the second quantity of time after the repeat presentation, the requested fast-forward of the second media clip.

18. The system of claim 17, wherein the computing device is configured to:
  enabling the fast-forward command for increasing quantities of time for additional repeat presentations, at the user device, of the first media clip.

19. The system of claim 17, wherein the plurality of program segments comprises at least a first program and a second program different from the first program,
  wherein the computing device is configured to:
    before receiving the request to fast-forward the second media clip, receive a request to stop playback of the first program and to start playback of the second program, and
    receive the request to fast-forward the second media clip by receiving a request to fast-forward a media clip included in the second program, and
  wherein the causing is based on determining that a sum of a time period that the first program was presented at the user device and a time period that the second program was presented at the user device is less than the second quantity of time.

20. The system of claim 17, wherein the computing device is configured to extend the first quantity of time based on a determination that a second user has joined a first user in viewing one or more of the plurality of program segments at the user device.

* * * * *